(12) United States Patent
Azmoon et al.

(10) Patent No.: US 11,410,127 B2
(45) Date of Patent: Aug. 9, 2022

(54) VISUALIZATION OF CHAT TASK RECORDING, LINKING MESSAGING, AND RECORD KEEPING

(71) Applicant: ServiceNow, Inc., Santa Clara, CA (US)

(72) Inventors: Troy Azmoon, Carlsbad, CA (US); Frederic B. Luddy, Rancho Santa Fe, CA (US)

(73) Assignee: ServiceNow, Inc., Santa Clara, CA (US)

( * ) Notice: Subject to any disclaimer, the term of this patent is extended or adjusted under 35 U.S.C. 154(b) by 278 days.

(21) Appl. No.: 15/492,572

(22) Filed: Apr. 20, 2017

(65) Prior Publication Data
US 2017/0308859 A1   Oct. 26, 2017

Related U.S. Application Data

(60) Provisional application No. 62/325,201, filed on Apr. 20, 2016.

(51) Int. Cl.
| | |
|---|---|
| *G06F 9/44* | (2018.01) |
| *G06F 9/00* | (2006.01) |
| *G06F 17/00* | (2019.01) |
| *G06Q 10/10* | (2012.01) |
| *G06Q 10/06* | (2012.01) |
| *H04L 51/046* | (2022.01) |

(Continued)

(52) U.S. Cl.
CPC ..... *G06Q 10/103* (2013.01); *G06Q 10/06311* (2013.01); *G06Q 10/107* (2013.01); *H04L 51/046* (2013.01); *H04L 51/08* (2013.01); *H04L 51/16* (2013.01)

(58) Field of Classification Search
CPC ............. H04M 3/5191; H04M 3/5166; G06Q 30/016; H04L 51/046
See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,028,301 B2 | 4/2006 | Ding |

(Continued)

OTHER PUBLICATIONS

Trello; "Getting Started with Trello (Demo"; Oct. 23, 2015; https://www.youtube.com/watch?v=xky48zyL9iA.

(Continued)

*Primary Examiner* — Jordany Nunez
(74) *Attorney, Agent, or Firm* — Fletcher Yoder P.C.

(57) ABSTRACT

A system is provided for displaying information related to a task in a chronological chat format. The system may include a memory, a processor configured to execute instructions stored within the memory, a network interface communicatively coupled to a network, a task database having records for a plurality of tasks, and a display that allows selection of a task record from the plurality of tasks. The display displays chat information obtained from the task record along with task-related data, such as customer data, received over the network interface in real time. The display may also allow selection of other individuals related to the task to participate in a chat session. The task-related data includes both textual data and attached file information.

24 Claims, 13 Drawing Sheets

(51) Int. Cl.
*H04L 51/08* (2022.01)
*H04L 51/00* (2022.01)

(56) References Cited

U.S. PATENT DOCUMENTS

| | | | |
|---|---|---|---|
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 8,903,933 B1* | 12/2014 | Bellini, III | H04L 29/08837 707/705 |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 9,819,729 B2 | 11/2017 | Moon | |
| 2002/0065912 A1* | 5/2002 | Catchpole | G06F 17/30873 709/224 |
| 2003/0131062 A1* | 7/2003 | Miyashita | G06F 17/30882 709/206 |
| 2003/0187672 A1* | 10/2003 | Gibson | G06Q 30/02 709/206 |
| 2005/0181878 A1* | 8/2005 | Danieli | A63F 13/12 463/42 |
| 2007/0094341 A1* | 4/2007 | Bostick | G06Q 10/107 709/207 |
| 2010/0205544 A1 | 8/2010 | Brzeski et al. | |
| 2011/0237329 A1* | 9/2011 | Evans | A63F 13/12 463/30 |
| 2012/0151377 A1 | 6/2012 | Schultz et al. | |
| 2016/0337276 A1* | 11/2016 | Nelson | H04L 65/4023 |
| 2016/0350059 A1* | 12/2016 | Sakai | G06F 13/00 |
| 2017/0031536 A1* | 2/2017 | Shah | G06Q 50/01 |

OTHER PUBLICATIONS

Stella Garber: "Introducing the All New Trello Business Class", Sep. 15, 2015; URL:http://blog.trello.com/introducing-the-all-new-trello-business-class; 13 pgs.

NOWsupport: "Connect Chat (ServiceNow)", Jan. 13, 2016; URL:https://www.youtube.com/watch?v=w9gi5pm6WjQ.

Patrick Li: "Chapter 3: Issue Management"; JIRA Essentials, Apr. 27, 2015, XP055376184, pp. 63-100.

International Search Report and Written Opinion for PCT Application No. PCT/US2017/028648, dated Jun. 16, 2017; 12 pgs.

* cited by examiner

VISUALIZATION OF CHAT TASK RECORDING, LINKING MESSAGING, AND RECORD KEEPING

CROSS-REFERENCE TO RELATED APPLICATION(S)

This application claims priority to U.S. Provisional Patent Application No. 62/325,201, filed on Apr. 20, 2016, which is herein incorporated by reference in its entirety.

TECHNICAL FIELD

The present disclosure relates in general to techniques and devices for visualization of chat task record, linking messaging, and record keeping.

BACKGROUND

Task and incident management can involve numerous parties and communications related to accomplishing the task or resolving an incident. When the communications take on a wide variety of forms (phone calls, emails, etc.), relevant communications or activities may be missed and the ultimate resolution of a problem or completion of a task can be delayed if an accurate status cannot be timely obtained.

SUMMARY

According to an implementation, a system is provided for displaying information related to a task in a chronological chat format, comprising a service provider comprising a non-volatile memory, a processor configured to execute instructions stored within the memory, a network interface communicatively coupled to a network, a task database comprising records for a plurality of tasks, a display that allows selection of a task record from the plurality of tasks, displays chat information obtained from the task record on the display along with task-related data, such as customer data, received over the network interface, e.g., from a customer, an agent, or service provider, in real time, wherein the task-related data comprises both textual data and attached file information. The display may also allow selection of other individuals related to the task to participate in the chat session.

BRIEF DESCRIPTION OF THE DRAWINGS

The description herein makes reference to the accompanying drawings wherein like reference numerals refer to like parts throughout the several views.

FIG. 10 is a screen shot according to an implementation showing a listing of incidents and their respective attributes.

FIG. 11 is a screen shot showing an incident record having a category that has recently been updated.

DETAILED DESCRIPTION

Figure 1:
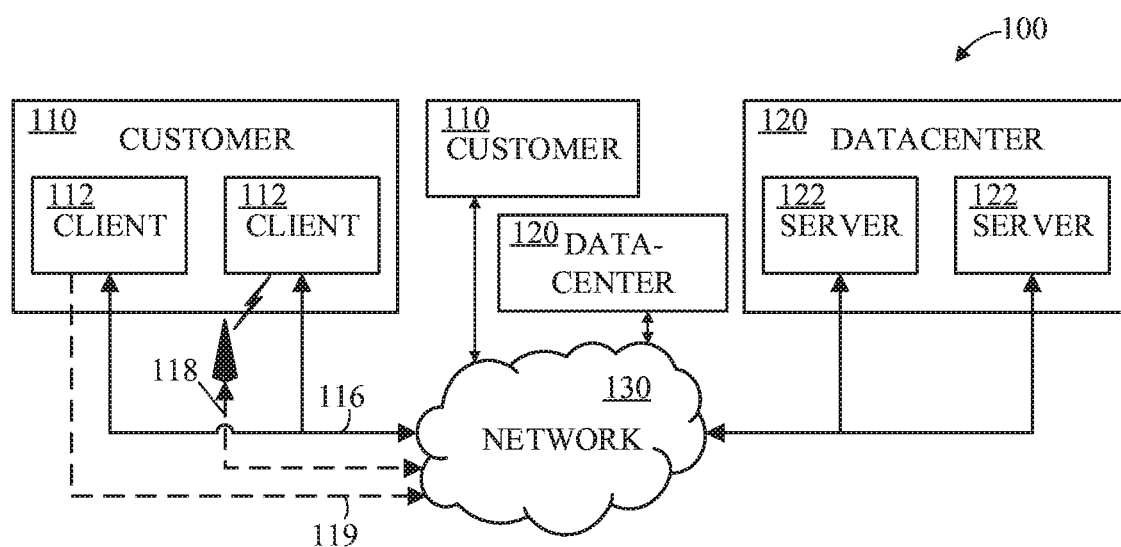
FIG. 1 is a block diagram of a distributed or cloud computing system.

A task-based system allows for the creation, editing, monitoring, acting upon, and completing activities that are associated with a task. In an information technology service management (ITSM) system, tasks can be things such as an incident (e.g., a call into a help desk because one's email is not working), an issue that needs to be resolved, a change to infrastructure, or any other sort of problem or activity.

Traditionally, the handling of such tasks utilized tools such as displayed lists and forms as the primary user interface elements for interacting with underlying data and records associated with the tasks. Additionally, interactions between individuals involved in a task could make use of a chat display in which information from involved individuals is presented in chronological order to the individuals involved in a particular conversation. However, users need more efficient and seamless ways of interacting with business systems, particularly task based systems. Present record-based interfaces can be cumbersome to use in all situations, particularly when users need to see information at a glance. Users typically and historically interact with records in database and ITSM systems using a record view, where attributes and values are displayed.

Disclosed herein is a system and method that provides a visualization of a task record in a conversation view by transforming the data included in the task record into chronologically ordered chat elements. Various implementations of the invention discussed herein provide a much richer role for the user chat, namely in the accessing of information, its inclusion into the chat conversation, and saving the contents of the richer chat information into a permanent record of the task. In sum, the chat described herein may include features related to linking information, messaging, and recordkeeping (storage) in the context of a chat-based user interface.

Thus, chat entries of a connect session related to the underlying service provider record, activity or status changes of the record, or field changes of the record as chat entries in the may serve as a form of user interface. The information included in the record may be displayed in a connect conversation/chat interface, and chat entries may be directly generated from the information stored within the record. In this connect framework, the record may be exposed as a chat within this framework.

Instead of providing a record-based interface, a conversation interface may be provided where the information included in the record is displayed in a conversation/chat interface, which may be distinguished from having a chat about or for a record, or having a chat linked to a record. Instead, the chat may be directly generated from the information stored within the record and, in an implementation, there does not have to be a separate chat object or data being queried. In implementations where there is a separate record, that record may be a one-to-one match with the information stored in the actual record or state changes of the actual record. In an implementation, the chat can be generated directly from the activity log of the record, and events of interest can be transformed into the chat. The chat user interface may be presented as a view into the actual record itself, instead of a chat about a record provided by other solutions. Thus, one can view the record as a chat, or, conversely, the chat as a record. This chat interface is advantageous because it allows people to work naturally (conversationally), while still following the business process. Also, it is possible to view actions taken or transactions related to a task (such as record closed, or state changed) as conversational style messages/updates.

In an implementation, a user can be permitted to interface directly with the record through the chat interface. For example, a command-type interface can be provided to permit a user to change, update, add, or delete information relating to a record. For example, an interface can be provided such that a user can type "change status to assigned" and the chat interface can interpret the command to change a status attribute in the record to a value of "assigned." In an implementation, the command-type interface can encompass a set of pre-determined commands and parameters. In an implementation, the user can be prompted with a list or sublist of available commands or parameters. For example, if a parameter requires the identification of a field or table, a list of acceptable field or tables can be provided for the user to select from. In an implementation, the interface can include natural language processing such that the user can interact with the record conversationally without being required to use pre-determined commands and parameters.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer, a virtual machine and the like. The datacenter 120 and servers 122 are examples only, and a cloud computing system may have a different number of datacenters and servers or may have a different configuration of datacenters and servers. For example, there may be tens of datacenters and each datacenter may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
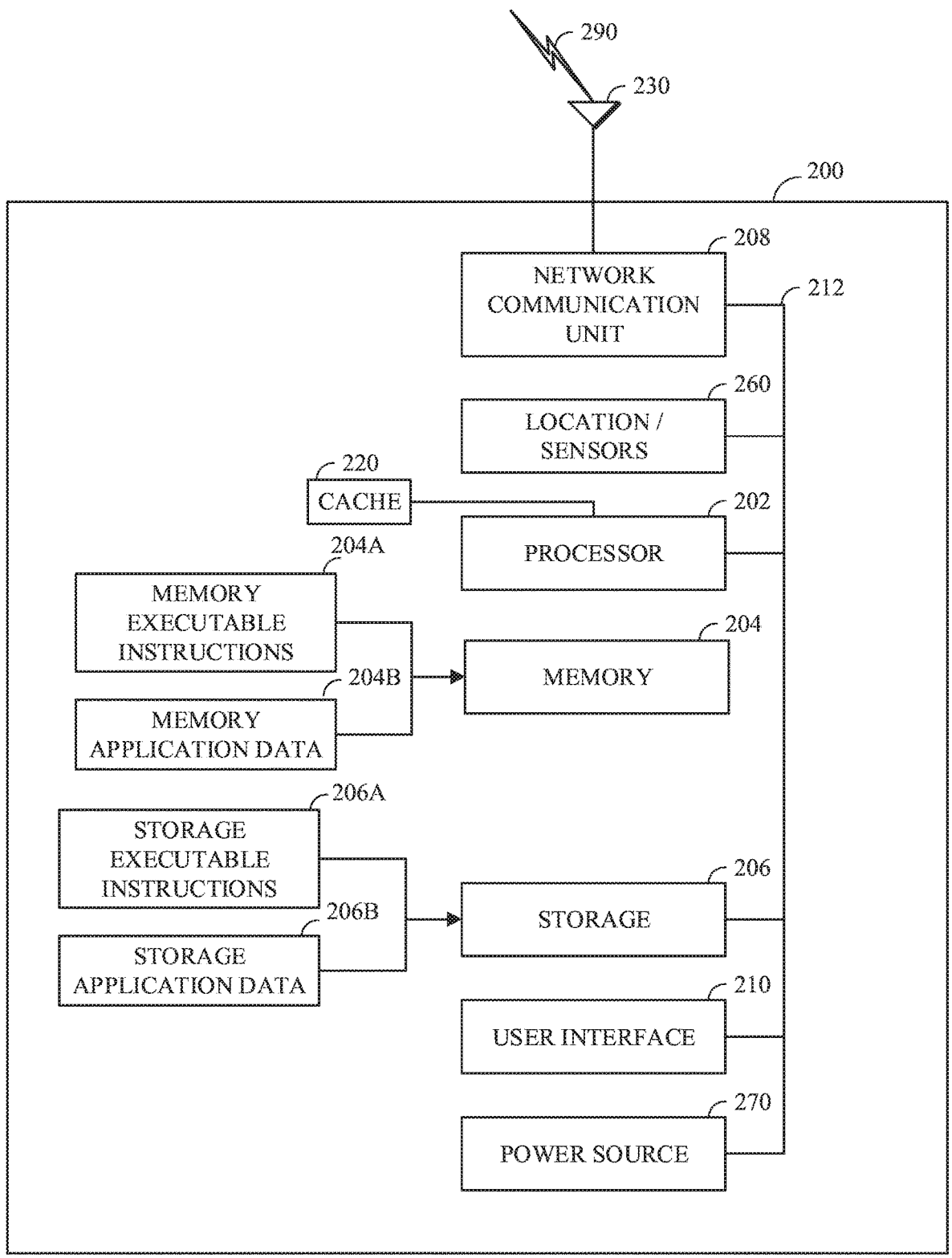
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a client 112 or server device 122 of the computing system 100 as shown in FIG. 1, including an infrastructure control server of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM) 204 can be any suitable non-permanent storage device that is used as memory. RAM 204 can include executable instructions and data for access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilize any of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
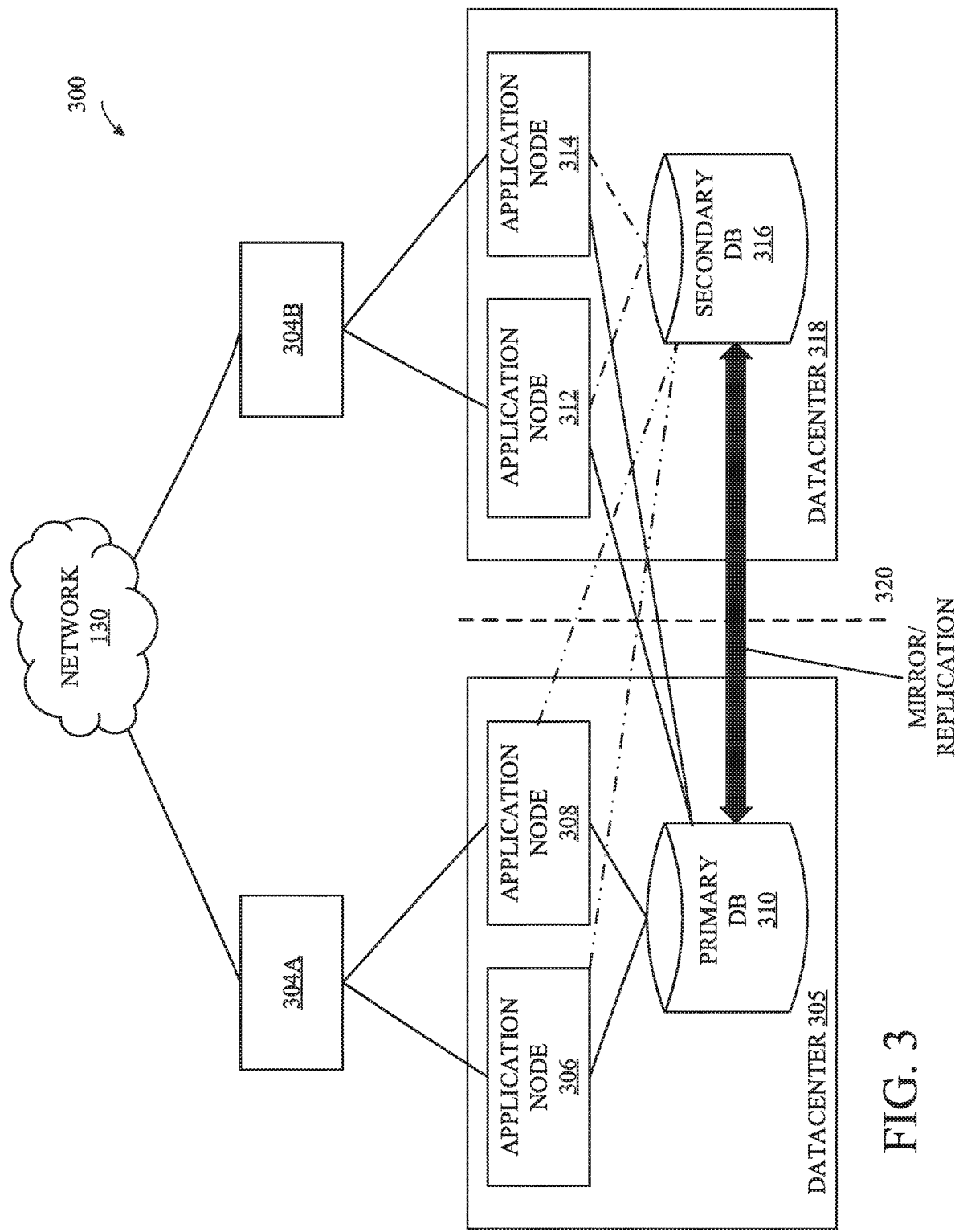
FIG. 3 is a block diagram of an implementation of a high availability processing system.

FIG. 3 is a block diagram of an implementation of a high availability processing system. The illustrated distributed computing system 300 can be, for example, an implementation of datacenter 120 and network 130 of FIG. 1. Broadly, the system 300 includes load balancers 304A-304B and two datacenters 305, 318. The load balancers 304A-304B are coupled to a telecommunications network graphically depicted by network 130. Load balancers 304A-304B may also include reverse proxy load balancers.

The datacenter 305 includes a primary database 310, and the datacenter 318 includes a secondary database 316. The datacenters 305, 318 operate in such a manner that the secondary database 316 can provide an exact or substantially exact mirror of the primary database 310. A line 320 is used to graphically emphasize the logical boundary between datacenters 305 and 318. Depending upon the intended application, the databases 310, 316 may be implemented using, for example, a relational database management system (RDBMS), an object database, an XML database, flat files, or the like.

Each datacenter can include two application nodes 306, 308, 312, 314, although a greater or lesser number can be used depending on the implementation. The application nodes can be implemented using processing threads, virtual machine instantiations, or other computing features of the datacenters that run programs on behalf of remotely sited clients, and exchange related data with such clients via the network 130. In connection with running these programs, occasions arise for the application nodes to store and retrieve data, with the databases 310 and 316 filling this role. In an implementation, each of the application nodes connects to a single primary database, regardless of whether said database is located in the same datacenter as said application node. For example, a primary database may be read/write and a secondary database may be configured to be read-only such that it mirrors changes from the primary database. Requests to the system 300 may be routed to the application nodes in the datacenter of the primary database first, followed by the other datacenter. In a failover situation, the secondary database may become read/write with the formerly primary database switched to mirror the secondary database (which becomes the primary database). In this situation, each application node can be reconfigured to point to the secondary database (now the primary database) as shown by the dashed lines.

As mentioned above, each datacenter 305, 318 may have its own load balancer 304A-304B. Each load balancer may be configured to direct traffic to respective servers and processing nodes located within its datacenter. In regard to proxy services, in one example the load balancers 304A-304B are configured to provide a single Internet-delivered service to remote clients via the network 130, where this service is actually provided by a server farm composed of the computerized servers of the datacenters 305, 318. The components 304A-304B also coordinate requests from remote clients to the datacenters 305, 318, simplifying client access by masking the internal configuration of the datacenters. The components 304A-304B may serve these functions by directing clients to processing nodes as configured directly or via DNS. Load balancer 304A-304B can be configured for sticky sessions. With sticky sessions, requests from a client can be forwarded to the same application node 306, 308 for the duration of the client session.

In regard to load balancing, the components 304A-304B can be configured to direct traffic to the secondary datacenter in the event the primary datacenter 305 experiences one of many enumerated conditions predefined as failure. The load balancing functionality of the components 304A-304B can be provided as separate components or as a single component.

Figure 4:
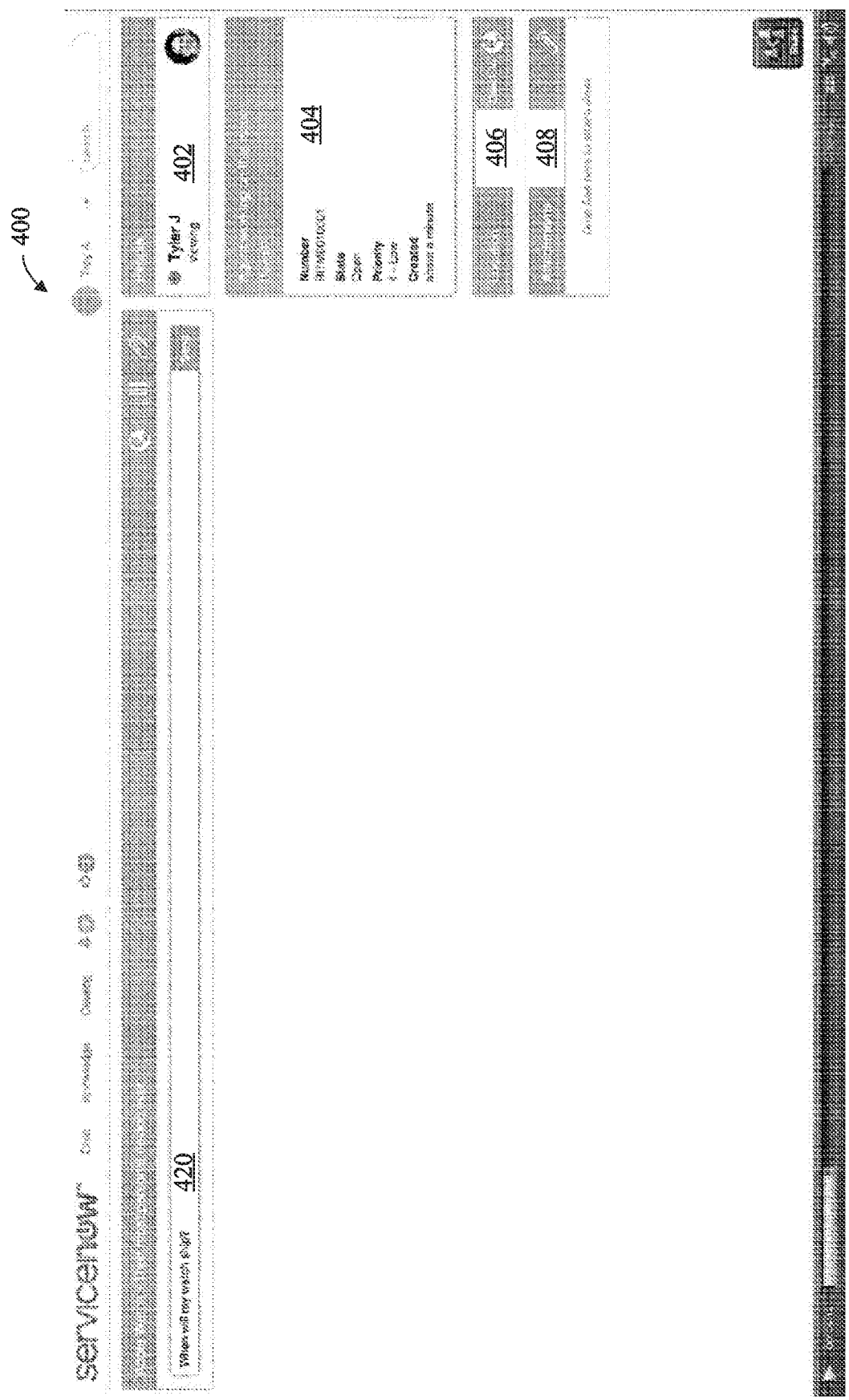
FIG. 4 is a screen shot according to an implementation showing a use case in which a customer is checking on the status of a watch that he ordered.

FIG. 4 is a screen shot according to an implementation showing a use case in which a customer is checking on the status of a watch that he ordered. On the display screen 400, which may be a web browser window or other application display window, basic information about the task, here a status inquiry about customer order may be displayed. This may include information about the people associated with a chat session on the display screen 402, along with a status indicator of the viewers, such as available, busy, away, etc. And an activity of the individual (e.g., viewing, typing, etc.) The agent working on the issue may be displayed in a region 404 along with a task identifier, the state of the incident (e.g., opened, assigned, closed, etc.), priority, and the time the task was created. A region 406 for accessing location information may be provided, as can a region 408 for attaching and displaying attachments associated with the task. A text entry region 420 for entering task chat may be provided. In this use case, a customer is inquiring about when a watch that he ordered will ship.

Figure 5:
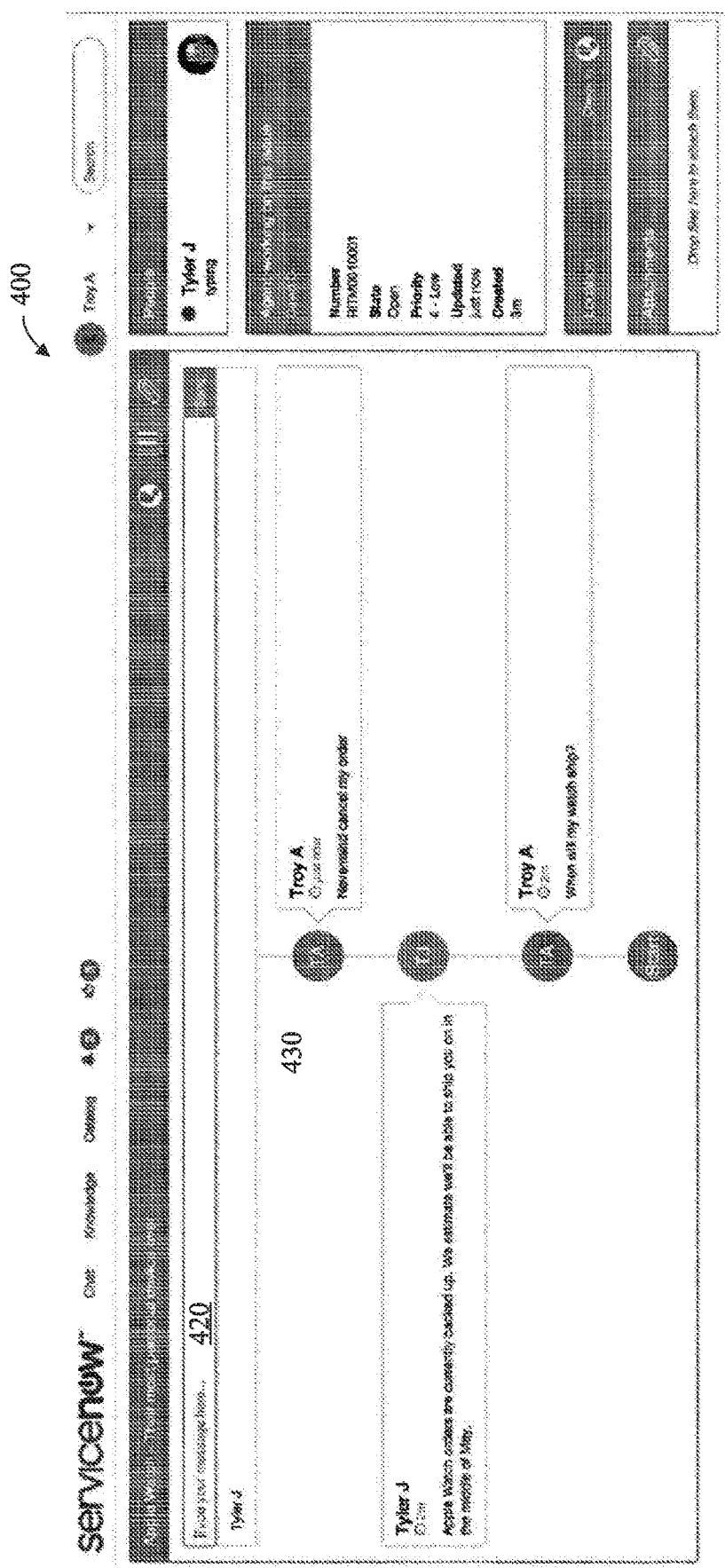
FIG. 5 is a screen shot according to the implementation shown in FIG. 4 in which a number of messages have been exchanged.

FIG. 5 is a screen shot according to the implementation shown in FIG. 4 in which a number of messages have been exchanged and a chat timeline 430 has been created between the customer and an agent, such as a customer service representative, a service provider, or an IT professional. As can be seen in FIG. 5, the service representative has informed the customer that the watch orders for this item are backed up and provides an estimate of when the watch would be shipped. This information was made available to the service representative without having to separately execute an order status application. Rather, all of the information about the watch order was made readily available to the rep., e.g., by clicking on a link to an order number or customer number so that the information could be accessed within the chat session.

The chat timeline 430 also indicates that the customer informed the customer service representative to cancel the order, presumably because the delay was too great. According to an implementation, the customer service representative can then access the order directly from the chat and cancel it and perhaps provide additional information. The chat session may then be stored with and become a part of the order record for the customer. Future reviewers can look at the order record and see the chat information regarding the cancellation of the order. Although not shown, all aspects of the order could have been implemented via the chat session and stored similarly. For example, an initial customer inquiry about the features of the watch, costs, extras/add-ons could be stored along with the initial actual order. Advantageously, this chat form of representation can provide an entire order cycle presented as a dialog between the customer and the customer service representative, and could track beyond purchasing through the entire lifecycle of the product.

Figure 6:
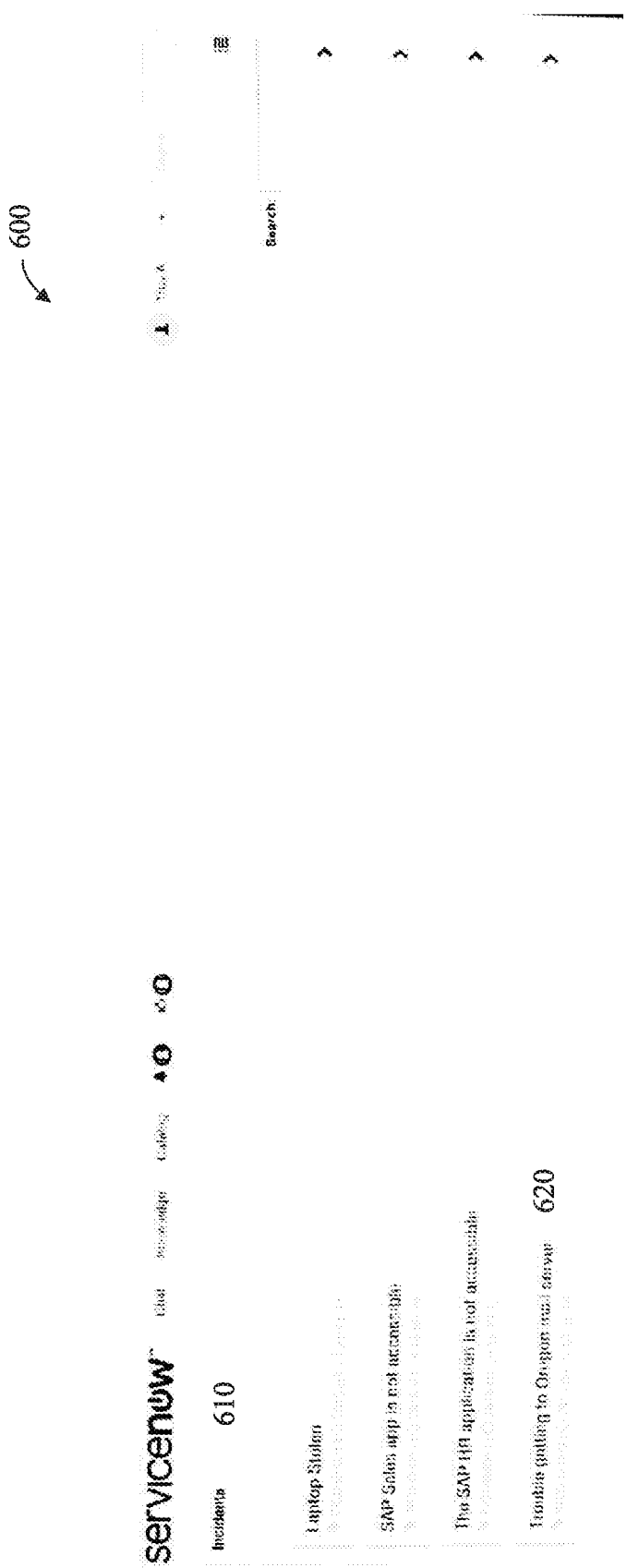
FIG. 6 is a screen shot according to the implementation in which a listing of incidents is shown.
Figure 7:
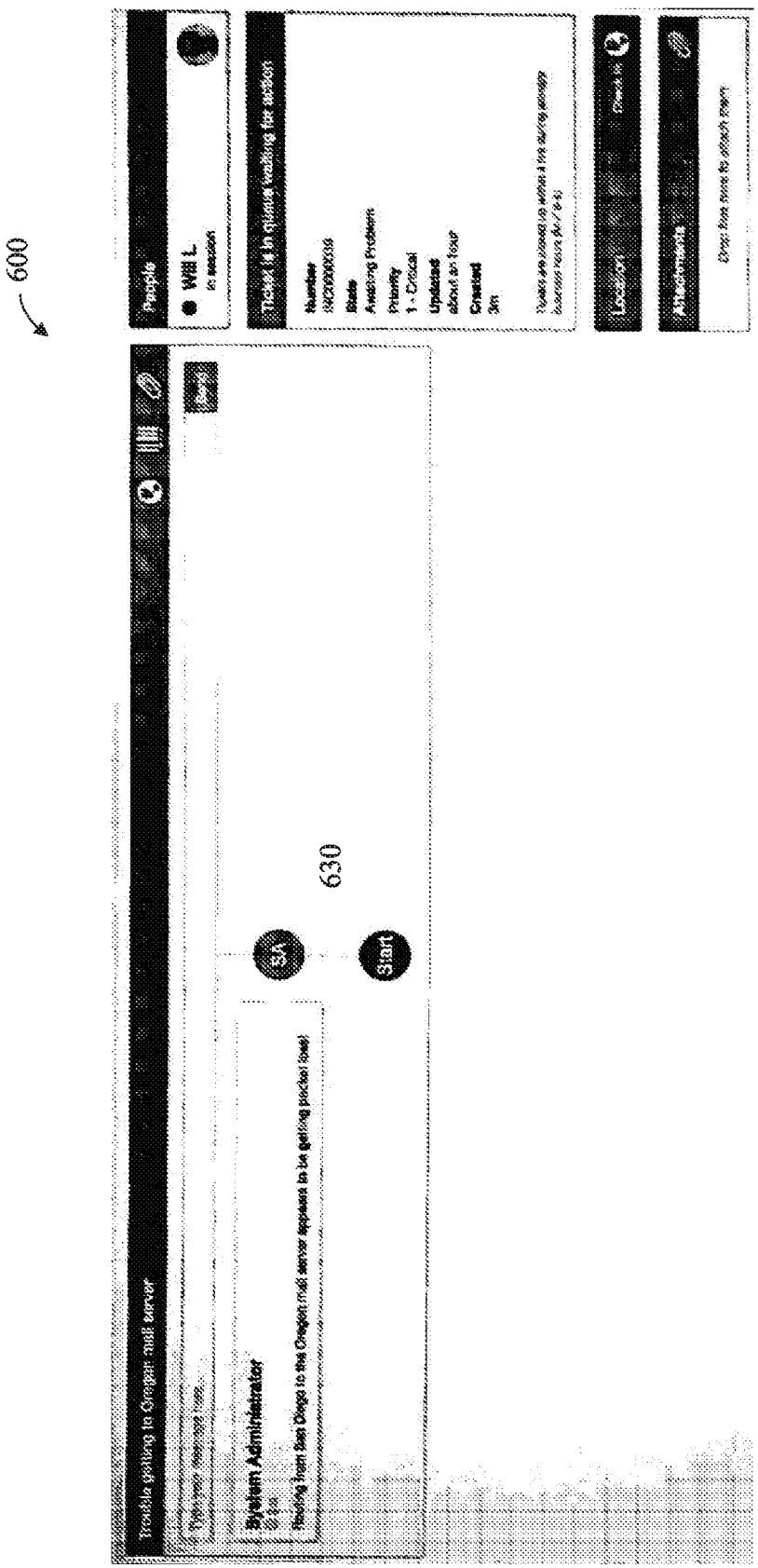
FIG. 7 is a screen shot according to the implementation shown in FIG. 6 that implements a timeline similar to one shown in FIG. 5.

FIG. 6 is a screen shot 600 according to the implementation in which a listing of incidents 610 is shown, including a laptop being stolen, an SAP sales application not being accessible, an SAP HR application not being accessible, and trouble getting to an Oregon mail server. In this use case, the technician chooses to look at the incident relating to trouble getting into the Oregon mail server 620. FIG. 7 is a screen shot according to the implementation shown in FIG. 6 that implements a timeline 630 similar to one shown in FIG. 5.

The information available to this incident on the display is similar to that shown in and discussed with respect to FIG. 4. Here, the system administrator provides more information about the problem by indicating that routing from San Diego to the Oregon mail server appears to betting packet loss. Relevant individuals can be selected to participate in the chat based on their particular expertise and indicated availability (or assigned activities relevant to the incident), again, without having to leave the chat display. As more technical information about the incident becomes available, the information can be added to the chat for viewing in an aggregated manner. This form of display provides a cohesive view of activity associated with the incident in a manner that emails or other communication mechanisms are unlikely to achieve.

Figure 8A:
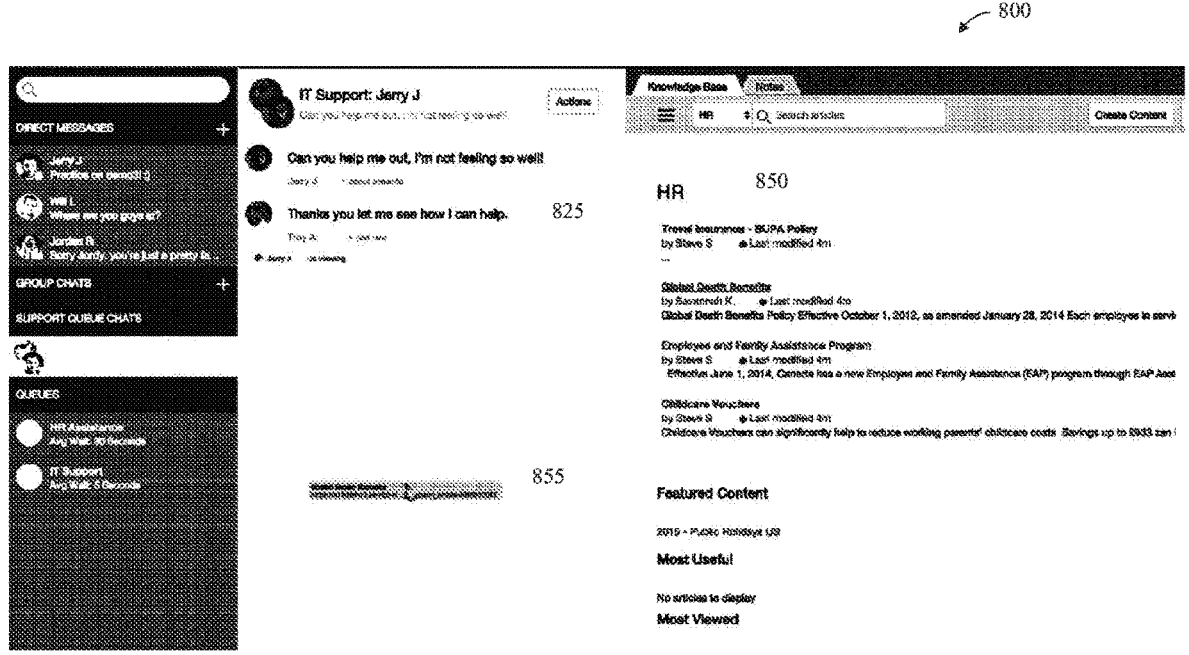
FIGS. 8A-C are screen shots showing how a customer service representative can access valuable resources "in chat" with a customer.
Figure 8B:
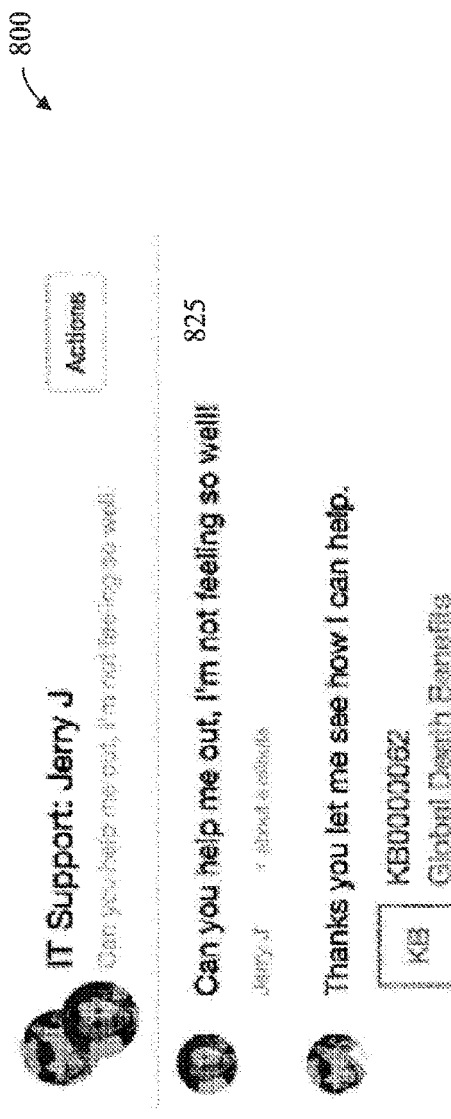
Figure 8C:
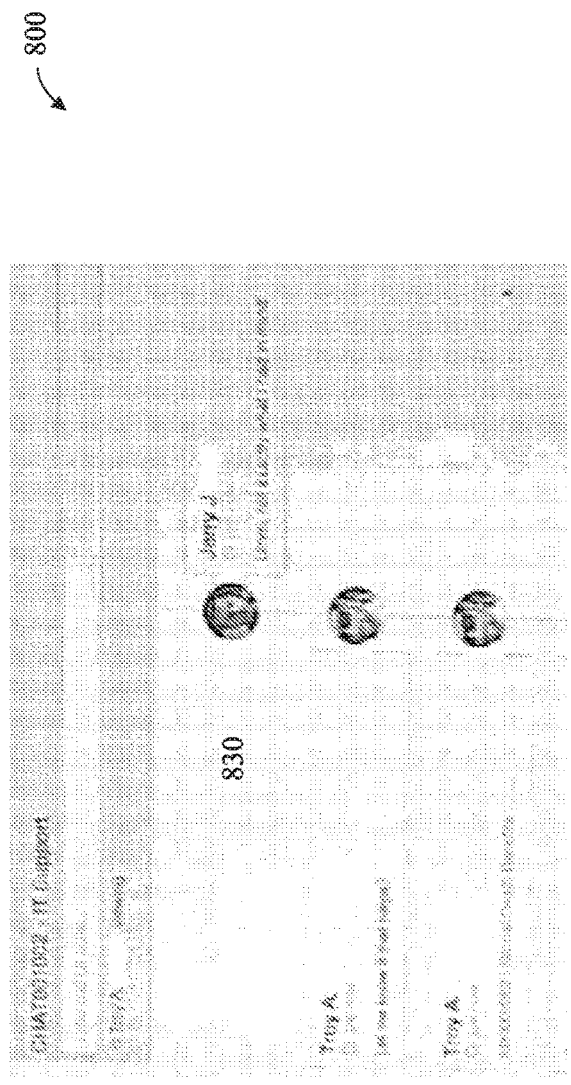

FIGS. 8A-C are screen shots 800 showing how a customer service representative (e.g., human resources representative) can access valuable resources "in chat" with a customer (e.g., employee). In an area of the display 825, a chat has begun in which the employee has requested help due to not feeling well. The representative has indicated that they will try to help. The representative then accesses a region of the display 850 containing task-related information, such as links to various articles from the HR group, and determines that an article on Global Death Benefits is likely to be the most helpful article. The representative can then simply drag and drop 855 the article into the chat area 825 where the employee can then access it. As can be seen in FIG. 8B, the article link has been added to the chat display area 825. FIG. 8C illustrates the employee's response to the provided information on the timeline 830.

Figure 9:
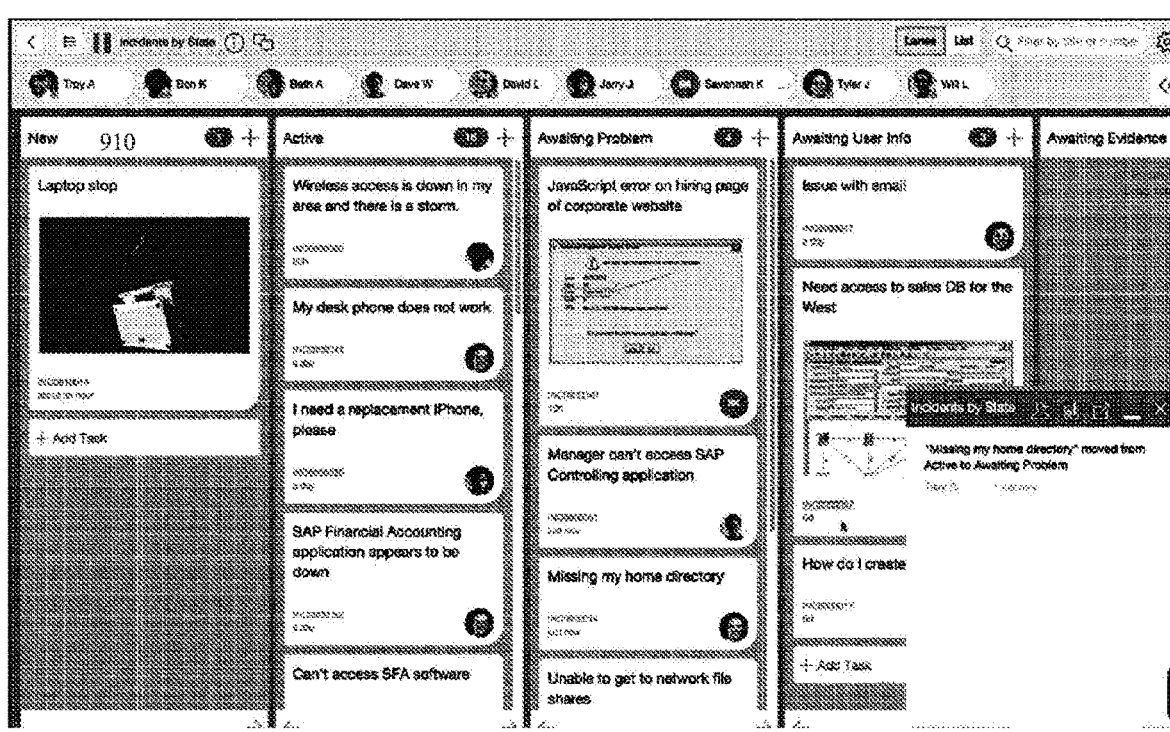
FIG. 9 is a screen shot according to an implementation showing a visual task board (VTB) in which incidents may be displayed according to status of the incident (or task in general) in real time.

FIG. 9 is a screen shot according to an implementation showing a visual task board (VTB) in which incidents may be displayed according to status of the incident (or task in general) 910 in real time. This form of display that includes the various tasks, their respective statuses, and the ability to select any task to view its contents and display a chat timeline relevant to that task can permit a much faster resolution to an incident since all of the relevant information and relevant players for resolving the incident can be accessed in a simplified manner.

Figure 10:
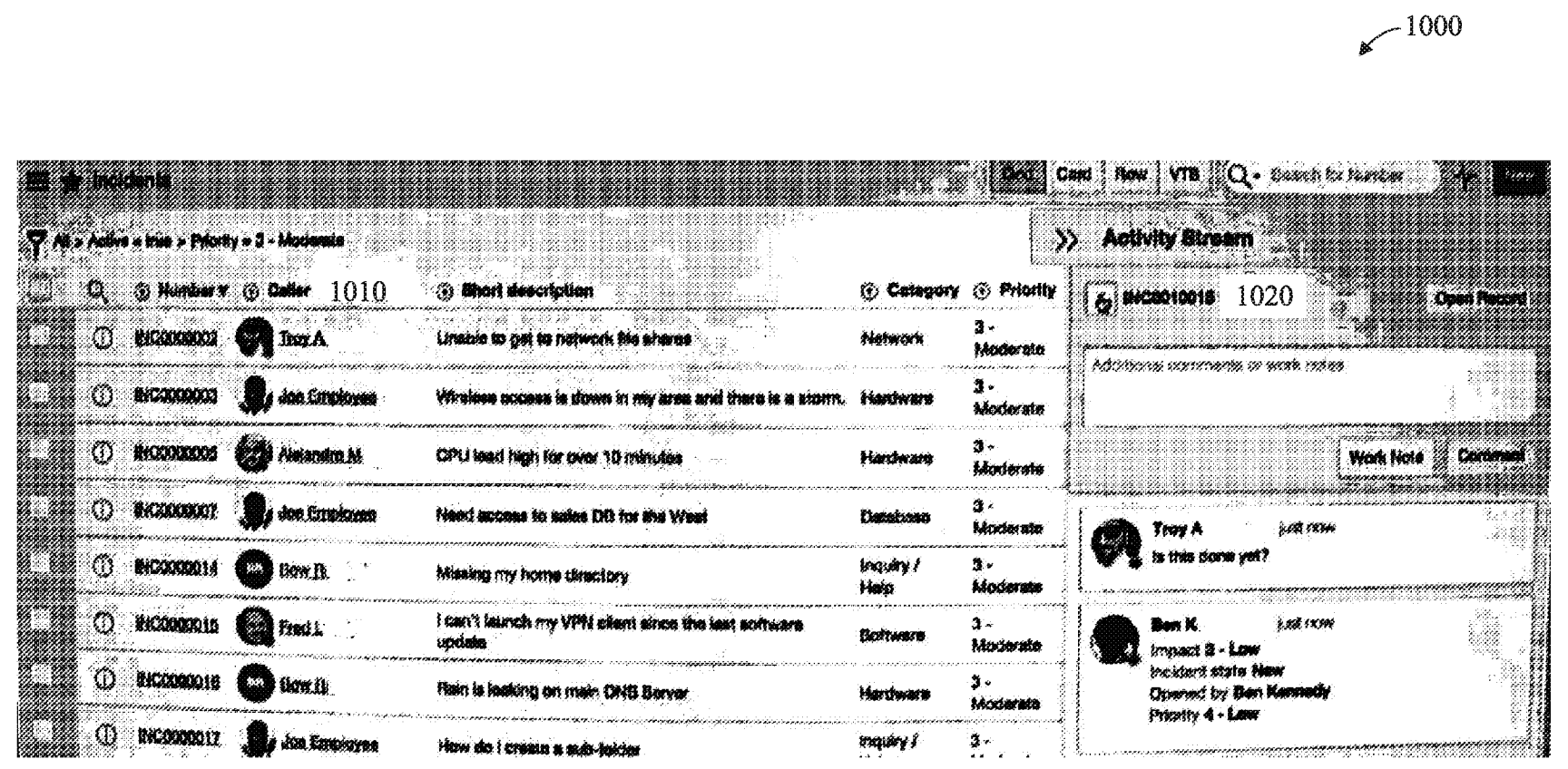
Figure 11:
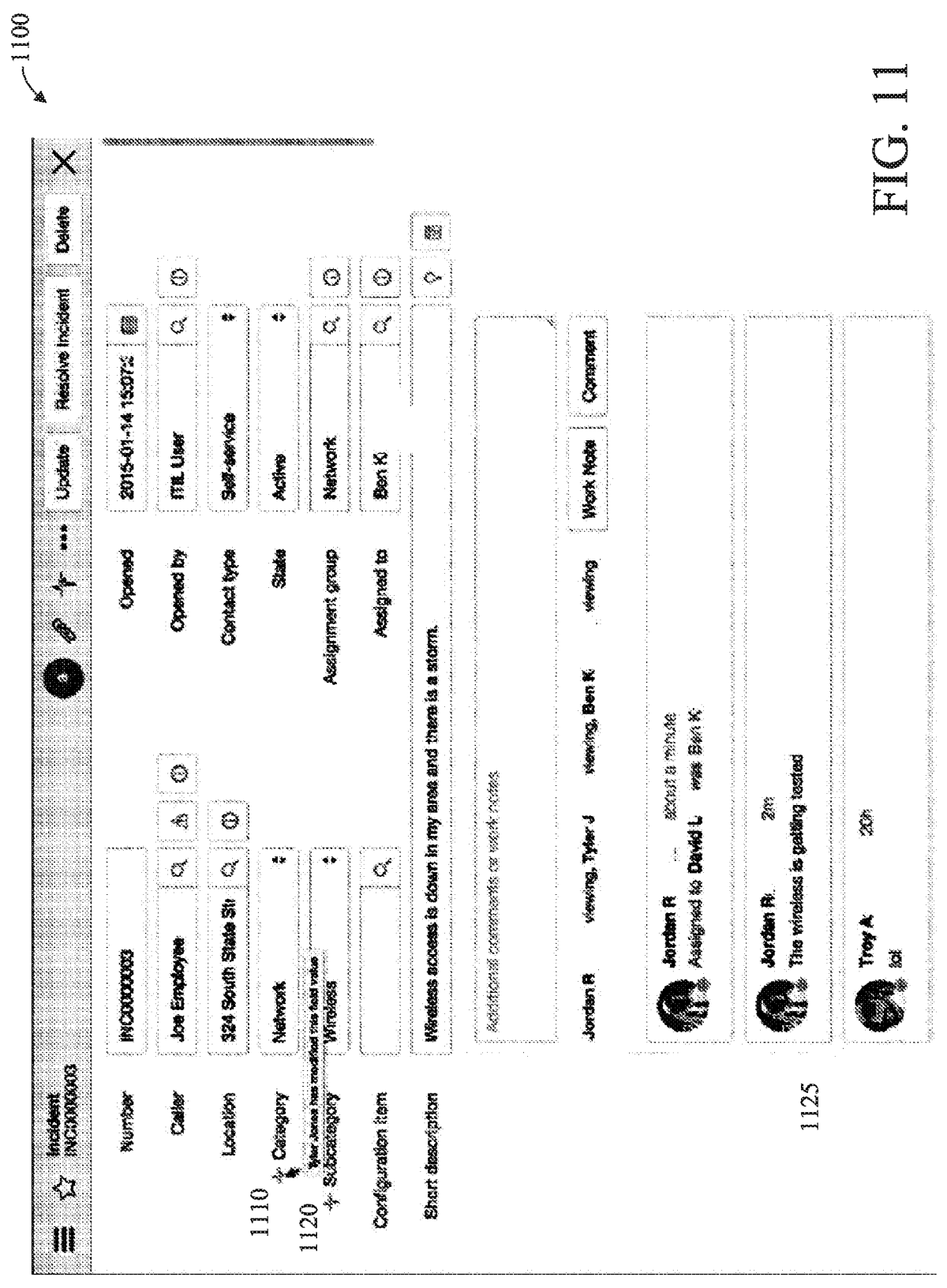

FIG. 10 is a screen shot according to an implementation showing a listing of incidents and their respective attributes. In this implementation, an individual selects an incident for closer inspection and invokes an activity stream area in which he queries a knowledgeable party as to whether an activity related to the incident has been completed. The related dialog captured in the chat may then be saved as a part of the incident record for subsequent reference. As noted above, this chat display can also be used to invite others into being involved, and can also be used to assign associated tasks with those individuals most able to address the problems (and possibly based on their availability, which may be indicated on the display). This permits real-time collaboration when resolving incidents or performing tasks. Activities can be easily coordinated without interference. Any changes to status, data, etc., can be broadcast in real-time so that any viewer can be confident that the data being viewed relevant to the incident or task is current. FIG. 11 is a screen shot 1100 showing an incident record having a category 1110 that has recently been updated (as shown, a lightning bolt on the left-hand side of the Category field indicates a recent change to the status), and a subcategory 1120 that has similarly been recently updated. Relevant chat information is also shown in a region 1125 of the display.

Figures 12A, 12B:
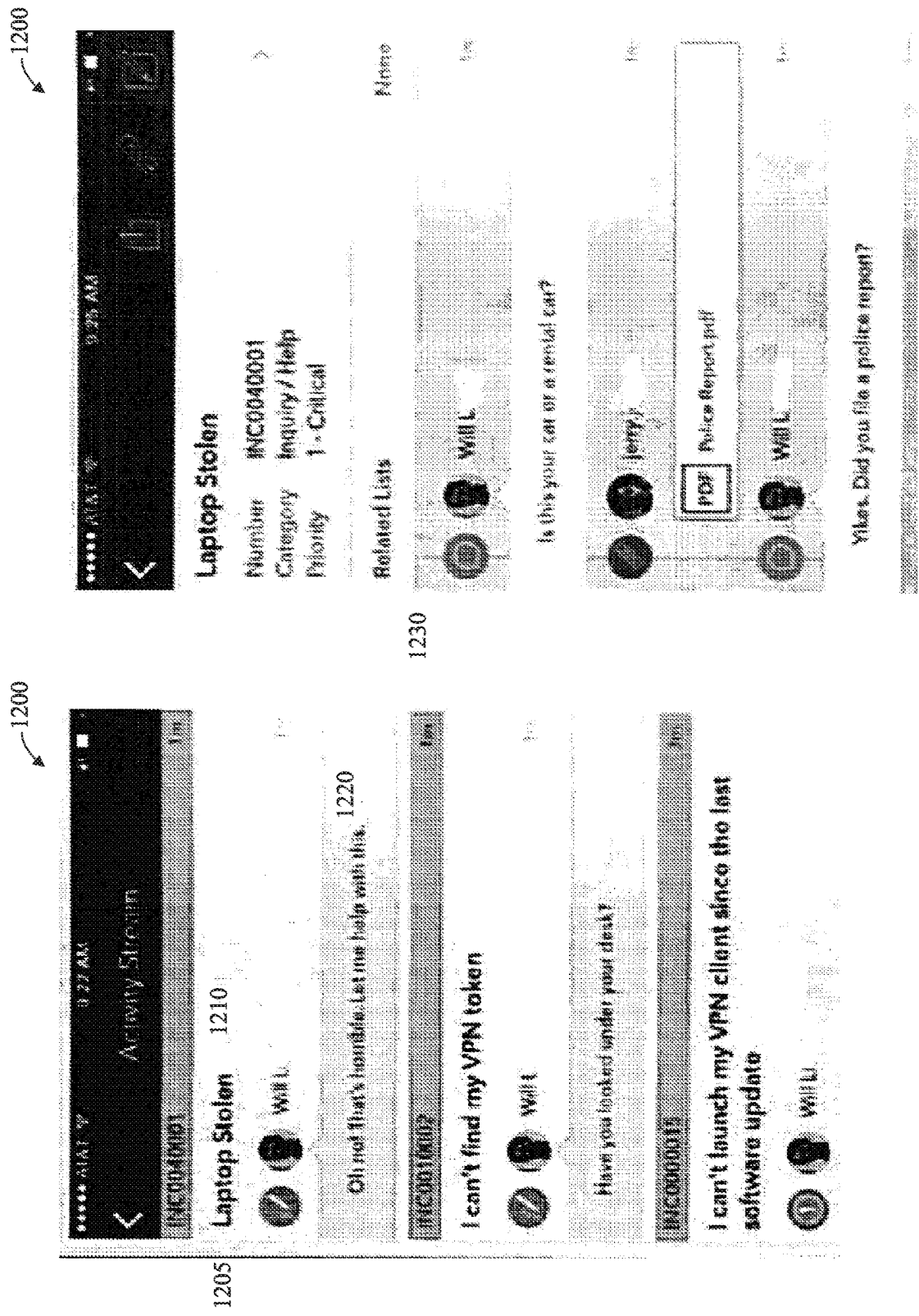
FIGS. 12A and B are screen shots according to an implementation on a small footprint display, such as that found on a mobile smartphone device or other similar display.

FIGS. 12A and B are screen shots 1200 according to an implementation on a small footprint display, such as that found on a mobile smartphone device or other similar display. These FIGS. show an example use case in which an employee's laptop is stolen. The mechanisms for display are similar, and communication information 1220 can be provided in the incident region 1210 of a multi-incident display list region 1205. Selecting, e.g., the "laptop stolen" incident can open up a chat window 1230 in which communications can take place in real time. Here, a number of questions have been asked by the representative. In the implementation shown in FIG. 12B, the representative asks if a police report was filed for the incident. In this case, the employee can access a PDF file of the police report from a data repository, such as a local storage device, Dropbox or other form of network storage, etc. Viewers for a wide variety of file types may be provided (e.g., Adobe Acrobat viewer for .PDF files, Microsoft Office viewer for various Microsoft Office files, etc.) so that files attached to the chat can easily be viewed by others who may be involved in the chat but not have access to the native application for the particular file type. The employee could, for example, take a picture with his smart phone of the car damage and attach the .jpg image file to the chat.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system for displaying information related to a task, comprising:
    a memory;
    a processor configured to execute instructions stored within the memory;
    a network interface configured to communicatively couple the processor to a network;
    a task database comprising a plurality of task records;
    a display operably coupled to the processor, and based at least in part on the instructions executed by the processor, the display being configured to:
        display a graphical user interface comprising:
            a first region to display the plurality of task records, wherein each task record of the plurality of task records is associated with a respective corresponding chat timeline between a customer and an agent;
            a second region to display one of the corresponding chat timelines; and
            a third region to display task-related information;
        receive selection of a first task record of the plurality of task records, wherein the first task record is associated with a first chat timeline of the corresponding chat timelines;
        populate the second region with the first chat timeline associated with the first task record; and
        populate the third region with the task-related information that comprises textual data, attached file information associated with the first task record, a status indicator, and links to documentation determined to be relevant based on the first chat timeline, wherein the task-related information is configured to be dragged from the third region to the second region, wherein dragging the task-related information into the second region results in the task-related information appearing in the second region.

2. The system, as set forth in claim 1, wherein the display, based at least in part on the instructions executed by the processor, is configured to provide a visualization of data in the corresponding chat timeline as chronologically ordered chat elements.

3. The system, as set forth in claim 2, wherein the processor directly generates the chronologically ordered chat elements from the data in the corresponding chat timeline.

4. The system, as set forth in claim 1, wherein the display, based at least in part on the instructions executed by the processor, is configured to provide an agent region to display information relating to the agent involved in the corresponding chat timeline.

5. The system, as set forth in claim 4, wherein the display, based at least in part on the instructions executed by the processor, is configured to display a state or a priority level of an incident discussed in the corresponding chat timeline.

6. The system, as set forth in claim 1, wherein the corresponding chat timeline comprises a plurality of corresponding links to websites.

7. The system, as set forth in claim 1, wherein the first chat timeline comprises file information from the customer involved in the first chat timeline.

8. The system, as set forth in claim 1, wherein the first chat timeline comprises file information from the agent involved in the first chat timeline.

9. The system, as set forth in claim 1, wherein the display, based at least in part on the instructions executed by the processor, is configured to provide a visual task board comprising the plurality of task records.

10. The system, as set forth in claim 9, wherein the display, based at least in part on the instructions executed by the processor, is configured to receive selection of one of the plurality of task records to display a chat timeline corresponding to the selection.

11. The system, as set forth in claim 1, wherein the display, based at least in part on the instructions executed by the processor, is configured to receive selection of other individuals to participate in the corresponding chat timeline.

12. A method for displaying information related to a task, comprising:
    displaying a graphical user interface comprising:
        a first region to display a plurality of task records, wherein each task record of the plurality of task records is associated with a respective corresponding chat timeline between a customer and an agent;
        a second region to display one of the corresponding chat timelines; and
        a third region to display task-related information;
    receiving selection of a first task record of the plurality of task records, wherein the first task record is associated with a first chat timeline of the corresponding chat timelines;

populating the second region with the first chat timeline associated with the first task record; and populating the third region with the task-related information that comprises textual data, attached file information associated with the first task record, a status indicator, and links to documentation determined to be relevant based on the first chat timeline, wherein the task-related information is configured to be dragged from the third region to the second region, wherein dragging and dropping the task-related information into the second region results in the task-related information appearing in the second region.

13. The method, as set forth in claim 12, comprising providing a visualization of data in the corresponding chat timeline as chronologically ordered chat elements.

14. The method, as set forth in claim 13, generating the chronologically ordered chat elements from the data in the corresponding chat timeline.

15. The method, as set forth in claim 12, comprising displaying an agent region to display information relating to the agent involved in the corresponding chat timeline.

16. The method, as set forth in claim 15, comprising displaying a state or a priority level of an incident discussed in the corresponding chat timeline.

17. The method, as set forth in claim 12, wherein the corresponding chat timeline comprises a plurality of corresponding links to websites.

18. The method, as set forth in claim 12, wherein the first chat timeline comprises file information from the customer involved in the first chat timeline.

19. The method, as set forth in claim 12, wherein the first chat timeline comprises file information from the agent involved in the first chat timeline.

20. The method, as set forth in claim 12, comprising displaying a visual task board comprising the plurality of task records.

21. The method, as set forth in claim 20, comprising providing at least one status indicator relating to a status of one or more of the plurality of task records.

22. The method, as set forth in claim 20, comprising receiving selection of one of the plurality of task records to display a chat timeline corresponding to the selection.

23. The method, as set forth in claim 12, comprising receiving selection of other individuals to participate in the first chat timeline.

24. The system of claim 1, wherein each task record of the plurality of task records is displayed in chronological order.

* * * * *